March 6, 1956  P. A. NOXON  2,737,052
GYROSCOPE
Filed March 28, 1951
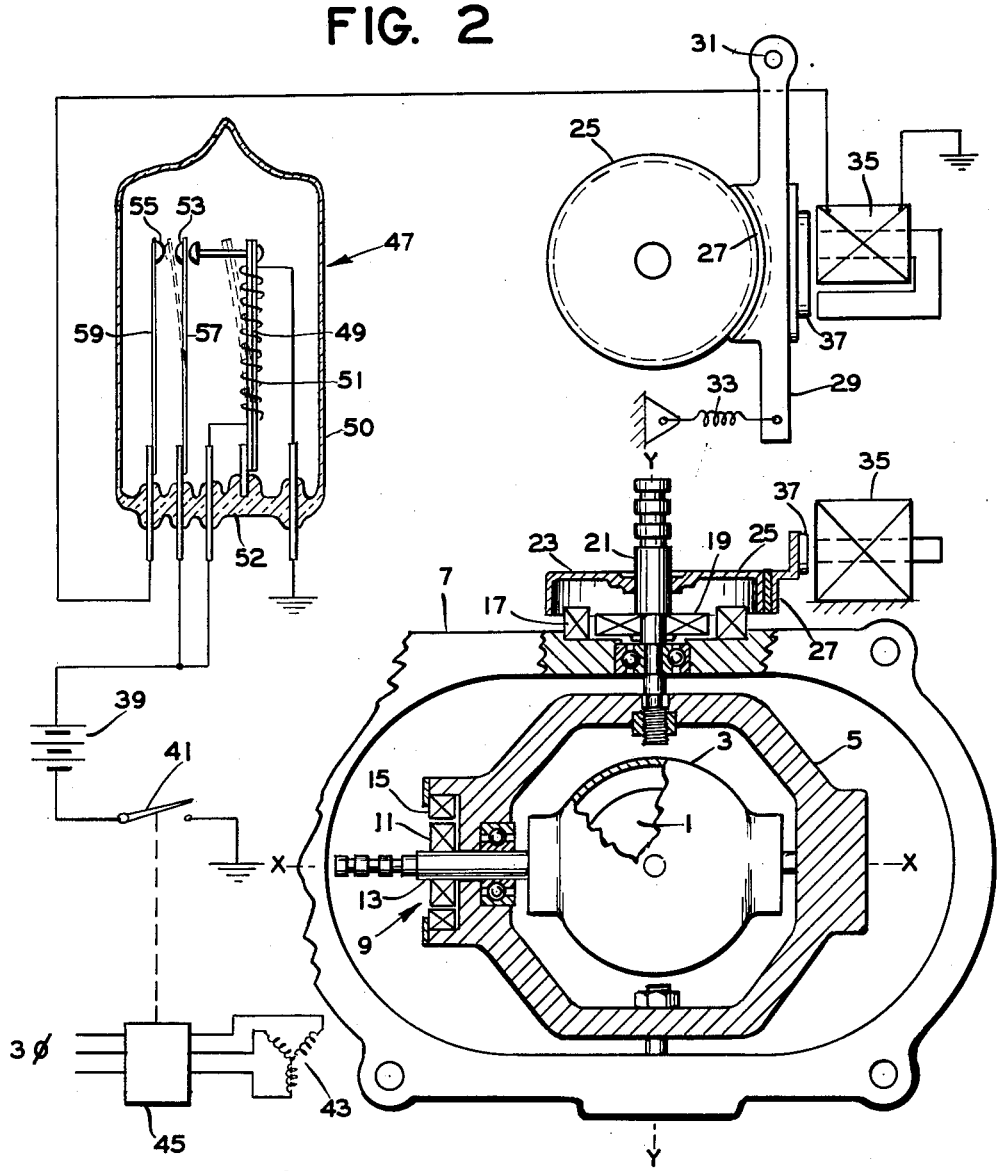
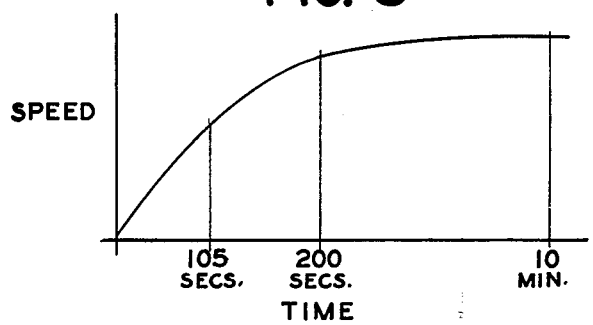
INVENTOR.
PAUL A. NOXON
BY
ATTORNEY

United States Patent Office 2,737,052
Patented Mar. 6, 1956

2,737,052

GYROSCOPE

Paul A. Noxon, Tenafly, N. J., assignor to Bendix Aviation Corporation, Teterboro, N. J., a corporation of Delaware Application March 28, 1951, Serial No. 217,990

2 Claims. (Cl. 74—5.1)

The invention relates to gyroscopes and has as an object to prevent nutation of the gyroscope while the rotor is attaining operating speed.

Another object is to restrain rotation of the gyroscope about one of its axes of freedom for a predetermined time interval after power is applied to the rotor.

Another object is to restrain rotation of the gyroscope about one of its axes of freedom until the rotor has attained a speed above which nutation will not occur.

Another object is to prevent tumbling of the gyroscope after power has been withdrawn from the rotor and while the rotor is reducing speed.

Another object is to restrain movement of the gyroscope about one of its axes of freedom by a brake while the rotor is attaining operating speed and while the rotor is slowing down and at rest.

The invention contemplates a gyroscope having a rotor adapted to rotate about a spin axis, means mounting the rotor for rotation about mutually perpendicular axes at an angle to the spin axis, and means restraining movement of the rotor about one of the mutually perpendicular axes for a predetermined time after power is applied to the rotor. The restraining means may comprise a brake engaging a brake drum on the gyroscope, and the brake may be controlled by a time delay device.

The foregoing and other objects and advantages of the invention will appear more fully hereinafter from a consideration of the detailed description which follows, taken together with the accompanying drawing wherein one embodiment of the invention is illustrated. It is to be expressly understood, however, that the drawing is for the purposes of illustration and description only, and is not to be construed as defining the limits of the invention.

In the drawing,

Figure 1 is in part a plan view, and in part a horizontal sectional view of a gyroscope constructed according to the invention;

Figure 2 is a schematic wiring diagram; and

Figure 3 is a graph showing the time required for the gyroscope motor to attain operating speed.

Referring now to the drawing for a more detailed description of the novel gyroscope of the present invention, the gyroscope is shown as comprising a rotor 1 supported by a casing 3 for rotation about a vertical spin axis. A gimbal 5 supports the rotor casing for rotation about an axis XX perpendicular to the spin axis, and an outer frame 7 supports gimbal 5 for rotation about a second axis YY perpendicular to the axis XX and to the spin axis.

An inductive device 9 having a rotor winding 11 fixed to a trunnion 13 of rotor casing 3 and a stator winding 15 fixed to gimbal 5 may be used to provide attitude signals about the axis XX. A similar inductive device 17 having a rotor winding 19 fixed to a trunnion 21 of gimbal 5 and a stator winding 23 fixed to outer frame 7 may be used to provide attitude signals about the axis YY. Suitable erecting means (not shown) may be provided to maintain the spin axis in a desired attitude. A brake drum 25 is secured to trunnion 21 and is engaged by a brake shoe 27 mounted on a brake lever 29 pivoted at one end on a pin 31. A spring 33 fastened at one end to brake lever 29 and at its other end to outer frame 7 urges brake shoe 27 into engagement with brake drum 25. A solenoid 35, when energized, attracts an armature 37 secured to brake lever 29 and pivots lever 29 against the tension of spring 33 to disengage brake shoe 27 from brake drum 25. Solenoid 35 is energized by a direct current source 39 and is connected in series with a time delay device 47 and a switch 41. Switch 41 is connected mechanically to a switch 45 which, when closed, connects gyroscope motor 43 across a three-phase source.

Time delay device 47 has a bimetallic element 49 mounted within an envelope 50 and supported at one end in the base 52 of the envelope. A heater element 51 is connected to battery 39 in series with switch 41 and is wrapped about bimetallic element 49 and heats the bimetallic element which flexes to the dotted line position shown in the drawing.

A pair of switch contacts 53, 55 are mounted at the ends of spring arms 57, 59 supported by base 52 of envelope 50. Solenoid 35 is connected in series with contacts 53, 55 to direct current source 39.

When the gyroscope rotor is energized by operating switch 45, switch 41 closes also and connects heater 49 across direct current source 39. As the temperature of bimetallic element 51 increases, the bimetallic element flexes to the dotted line position shown in the drawing and closes contacts 53, 55, whereupon solenoid 35 is energized and attracts armature 37 thereto. Brake lever 29 pivots about pin 31 and brake shoe 27 disengages brake drum 25 and the gyroscope is free to rotate about axis YY.

As shown in Figure 3, the gyroscope rotor in one embodiment of the invention attained a speed at which the gyroscope would not nutate in 105 seconds, and the gyroscope rotor attained operating speed in approximately 200 seconds. The gyroscope rotor continued to accelerate and finally achieved full operating speed after approximately 10 minutes. In the embodiment referred to, contacts 53, 55 of the time delay device preferably close after 105 seconds so that the brake is released after the gyroscope rotor has attained a speed at which the gyroscope will not nutate. The gyroscope runs at approximately one-half operating speed when the brake is released.

When power is withdrawn from motor 43 of the rotor by opening switch 45, switch 41 is operated and solenoid 35 is de-energized immediately, whereupon brake shoe 27 engages brake drum 25 and holds the gyroscope against tumbling while the rotor loses speed and while it is stopped.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. In a gyroscope having a rotor adapted to rotate about a spin axis, means mounting said rotor for angular movement about mutually perpendicular axes at an angle to said spin axis, a brake restraining movement of said rotor about only one of said mutually perpendicular axes including yieldable means urging said brake into operative gimbal restraining position, a solenoid arranged to release said brake when energized, and a time delay device in circuit with said solenoid, arranged to release said brake and provide for angular movement of said rotor about said last-mentioned axis a predetermined time interval after power is applied to said rotor.

2. In a gyroscope having a rotor adapted to rotate about a spin axis, means including a gimbal mounting said rotor for angular movement about mutually perpendicular axes at an angle to said spin axis, a brake drum fixed relative to said gimbal, a brake shoe arranged to engage said brake drum to restrain angular movement of said gimbal about its axis, yielding means urging said brake shoe into engagement with said brake drum, a solenoid arranged to release said brake shoe from said brake drum, and a time delay device controlling energization of said solenoid so as to release said brake shoe from said drum and provide for angular movement of said rotor about the gimbal axis a predetermined time interval after power is applied to said rotor.

References Cited in the file of this patent

UNITED STATES PATENTS

| | | |
|---|---|---|
| 2,283,720 | Brandt | May 19, 1942 |
| 2,441,307 | Alkan | May 11, 1948 |
| 2,521,379 | Leathers et al. | Sept. 5, 1950 |
| 2,523,270 | Barkalow et al. | Sept. 26, 1950 |
| 2,555,981 | Lynch et al. | June 5, 1951 |
| 2,605,641 | Barkalow | Aug. 5, 1951 |